(12) United States Patent
Scharf et al.

(10) Patent No.: US 8,882,010 B2
(45) Date of Patent: Nov. 11, 2014

(54) HERB GRINDER

(71) Applicant: The Violina Syndicate, LLC, Los Angeles, CA (US)

(72) Inventors: Eitam Scharf, Los Angeles, CA (US); Kimberly Dian Grant, Los Angeles, CA (US)

(73) Assignee: The Violina Syndicate, LLC, Los Angeles, CA (US)

( * ) Notice: Subject to any disclaimer, the term of this patent is extended or adjusted under 35 U.S.C. 154(b) by 0 days.

(21) Appl. No.: 13/844,108

(22) Filed: Mar. 15, 2013

(65) Prior Publication Data

US 2013/0214073 A1 Aug. 22, 2013

Related U.S. Application Data

(63) Continuation-in-part of application No. 13/400,016, filed on Feb. 17, 2012, now Pat. No. 8,672,249, which is a continuation-in-part of application No. 13/010,763, filed on Jan. 20, 2011, now Pat. No. 8,636,237.

(30) Foreign Application Priority Data

Dec. 20, 2012 (CN) ...................... 2012 2 0710951 U

(51) Int. Cl.
*B02C 17/02* (2006.01)
*A47J 17/00* (2006.01)
*B02C 19/20* (2006.01)
*A47J 43/25* (2006.01)

(52) U.S. Cl.
CPC . *B02C 19/20* (2013.01); *A47J 43/25* (2013.01)
USPC .......................................... 241/95; 241/273.1

(58) Field of Classification Search
USPC ............ 241/95, 168, 273.1–273.4, 296, 298, 241/261.2, 261.3, 92
See application file for complete search history.

(56) References Cited

U.S. PATENT DOCUMENTS

| 117,924 | A | * | 8/1871 | Peirce ........................ 241/273.1 |
| 165,143 | A | * | 6/1875 | Woodward ................ 241/273.1 |
| 268,511 | A | * | 12/1882 | McCobb ....................... 241/100 |
| 307,180 | A | * | 10/1884 | Cunnack ....................... 241/209 |
| 337,619 | A | * | 3/1886 | Salmon ......................... 241/168 |
| 463,823 | A | * | 11/1891 | Beach ............................ 99/623 |

(Continued)

FOREIGN PATENT DOCUMENTS

| KR | 2019950029440 | 11/1995 |
| KR | 1020060046519 | 5/2006 |

(Continued)

OTHER PUBLICATIONS

PCT/US2011/063329; PCT International Search Report and Written Opinion; dated Aug. 27, 2012.

(Continued)

*Primary Examiner* — Faye Francis
(74) *Attorney, Agent, or Firm* — Fulwider Patton LLP

(57) ABSTRACT

A grinder specially adapted for grinding herbs has a sheet with unique groove patterns forming a grinding area. Although it is a manual grinder, the grinder does not require the use of cutting blades, making it much safer to use. The grinder is particularly suitable for grinding softer herbs.

14 Claims, 7 Drawing Sheets

(56) References Cited

U.S. PATENT DOCUMENTS

| | | | | |
|---|---|---|---|---|
| 807,228 | A * | 12/1905 | Wurster | 241/296 |
| 931,828 | A * | 8/1909 | Williams | 241/296 |
| 933,507 | A | 9/1909 | Weber | |
| 1,000,628 | A * | 8/1911 | Ryther | 241/251 |
| 1,410,008 | A * | 3/1922 | Gale et al. | 241/95 |
| 1,611,244 | A * | 12/1926 | Schmidt | 241/89.4 |
| 1,624,032 | A * | 4/1927 | Andrews | 241/296 |
| 1,845,522 | A | 2/1932 | Rowley | |
| 1,915,869 | A * | 6/1933 | Rowley | 241/95 |
| 2,110,799 | A * | 3/1938 | Henschell | 241/95 |
| 2,154,650 | A * | 4/1939 | Wishinsky | 241/273.2 |
| 2,204,057 | A * | 6/1940 | Swartz | 241/146 |
| 2,225,658 | A * | 12/1940 | Rauchfuss | 241/37.5 |
| 2,252,859 | A | 8/1941 | Murdock | |
| 2,405,056 | A | 7/1946 | Rosenbloom | |
| 2,500,560 | A * | 3/1950 | Morris | 241/95 |
| 2,585,881 | A * | 2/1952 | Walker | 241/198.1 |
| D167,270 | S | 7/1952 | Marcus | |
| 3,045,321 | A | 7/1962 | McDermott | |
| 3,121,450 | A * | 2/1964 | Cronheim | 241/101.01 |
| 3,604,490 | A * | 9/1971 | Bricker | 241/273.2 |
| 3,858,815 | A * | 1/1975 | Black | 241/168 |
| 4,037,793 | A * | 7/1977 | Puustinen | 241/30 |
| 4,240,806 | A | 12/1980 | Frantzen | |
| 4,272,612 | A | 6/1981 | Oliver | |
| 4,749,135 | A * | 6/1988 | Walsh | 241/247 |
| 4,790,488 | A | 12/1988 | Borner | |
| 4,874,136 | A * | 10/1989 | Webster | 241/251 |
| 5,100,506 | A | 3/1992 | Sturtevant | |
| D347,979 | S | 6/1994 | Feer et al. | |
| 5,711,491 | A | 1/1998 | Molo | |
| 6,082,645 | A | 7/2000 | Himmighofen | |
| D447,022 | S | 8/2001 | Wong | |
| D447,391 | S | 9/2001 | Bodum | |
| 6,318,652 | B1 | 11/2001 | Liu | |
| 6,402,067 | B1 * | 6/2002 | Webster | 241/28 |
| 6,467,709 | B1 | 10/2002 | Hattori | |
| D474,378 | S | 5/2003 | Brandenburg | |
| D480,613 | S | 10/2003 | Wong | |
| 6,860,441 | B2 | 3/2005 | Richardson | |
| 6,883,697 | B1 | 4/2005 | Chi Kuo | |
| D669,747 | S | 10/2012 | Scharf | |
| 8,381,640 | B1 * | 2/2013 | Wilson | 99/444 |
| 2003/0222162 | A1 | 12/2003 | Klamer | |
| 2007/0029424 | A1 * | 2/2007 | Gorton-Hulgerth et al. | 241/298 |
| 2007/0251100 | A1 | 11/2007 | Fisk | |
| 2009/0193662 | A1 | 8/2009 | Van Deursen | |
| 2010/0242745 | A1 | 9/2010 | Smith | |
| 2011/0017853 | A1 * | 1/2011 | Smith et al. | 241/95 |
| 2012/0187231 | A1 | 7/2012 | Scharf | |

FOREIGN PATENT DOCUMENTS

| | | |
|---|---|---|
| RU | 2129469 | 4/1999 |
| SU | 1699342 | 12/1991 |
| SU | 1747016 | 7/1992 |
| WO | 2006094571 | 9/2006 |

OTHER PUBLICATIONS

What Makes a Microplane Tool Sharp from the Web site printout of Jan. 19, 2011 at http://us.microplane.com/whymicroplanetoolsworbetter.aspx (1 page).

PCT International Search Report, PCT/US2013/077325.

* cited by examiner

HERB GRINDER

CROSS-REFERENCES TO RELATED APPLICATIONS

This application is a continuation-in-part of U.S. application Ser. No. 13/400,016, filed Feb. 17, 2012, now U.S. Pat. No. 8,672,249, which is a continuation-in-part of U.S. application Ser. No. 13/010,763, filed Jan. 20, 2011, now U.S. Pat. No. 8,636,237, both of which are incorporated by reference in their entirety.

BACKGROUND

This invention relates generally to grinders, and more particularly has referred to a grinder specifically designed for grinding herbs.

There are currently two types of grinders. One is the electric grinder, which is motor-driven and cuts and grinds in rotation. Although efficient, it is usually large and not easy to carry. It also needs to be self-powered or requires connection to an external power source. The second type of grinder is a manual grinder. These types of grinders are smaller with many cutting blades, and the user needs to hold both the grinder and the material being ground while grinding. The sharp cutting blades, and the need for the user to grind the material back and forth manually, can pose a safety hazard and may be dangerous to the user.

A need exists for a new type of grinder which solves the safety issue, and is easier and safer to use for grinding herbs. The present invention fulfills those needs.

SUMMARY OF THE INVENTION

Briefly, and in general terms, the present invention relates to a new type of grinder for grinding herbs embodying a sheet with novel groove patterns forming a grinding area.

The grooves can have a variety of different configurations and shapes including rectangles, squares, circles, ovals, hearts, and other polygonal shapes in aligned or staggered arrangements. The grooves also may be configured as rings, and may feature a plurality of rings concentrically arranged at specific radial intervals.

The angle between the side wall of the grooves and the adjacent surface of the sheet can be perpendicular as well as acute or obtuse, and may be selected for optimum desired performance.

The sheet can be made of plastic, metal, wood, or glass. The surface of the sheet can be coated with a non-stick material. The sheet may be either flat or curved.

The grinder can have one or multiple groups of grinding areas.

The sheet can be provided with a plurality of through holes which are distributed in the grooves and/or on the surface of the sheet.

When a herb grinder made in accordance with the present invention is used as a manual grinder, it is safer to use because it does not require cutting blades on the surface that could cut the user's fingers during use. The grinding area is formed by the special grooved sheet described, which makes the grinding safer and easier.

A grinder made in accordance with the present invention is particularly suitable for use in grinding soft herbs, spices, fruits, nuts, and tobacco, etc. The grinder is easy to carry, and can easily fit in a briefcase, business card holder, or even a wallet. The user also can carry it in a book. In a preferred form, the grinder is about the size of a credit card. Its shape can be rectangular, round, oval, or other regular or irregular polygonal shapes.

These and other features and advantages of the invention will become more apparent from the following detailed description, taken in conjunction with the accompanying drawings, which illustrate, by way of example, the features of the invention.

DETAILED DESCRIPTION OF THE PREFERRED EMBODIMENTS

Figure 1:
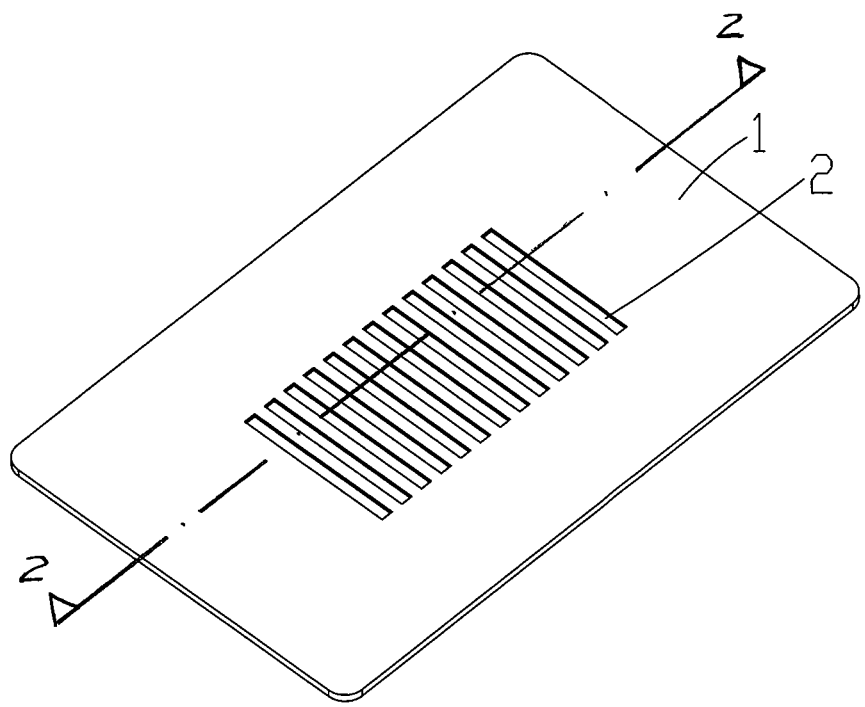
FIG. 1 is a perspective view of a herb grinder embodying novel features of the present invention.
Figure 2:
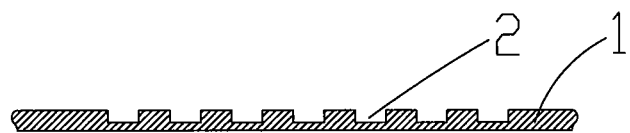
FIG. 2 is a sectional view taken substantially along the line 2-2 of FIG. 1.

Referring now to the drawings, and in particular to FIGS. 1 and 2, the invention is embodied in a grinder of a type especially adapted for grinding herbs. In accordance with the present invention, the grinder includes a sheet 1 with a plurality of grooves 2 forming a grinding area which does not require cutting blades that could easily cut a user's fingers. As shown in FIG. 2, the grooves in this particular embodiment comprise a series of spaced-apart parallel notches of elongated rectangular shape formed into at least the top surface of the sheet and extending horizontally across a portion of the surface. However, the size, shape and arrangement of the grooves can vary, as will be later explained, and are selected so as to provide a suitable grinding area on the surface of the sheet.

As previously noted, the grinder shown in FIGS. 1 and 2 does not have cutting blades that could easily cut a user's fingers. Instead, the grooved sheet structure forms the grinding area. The sidewalls of the grooves 2 provide a grinding action. The user's fingers are protected because those walls are not on the surface of the sheet.

The grinder shown in FIGS. 1 and 2 is particularly suitable for grinding softer herbs, spices, fruits, nuts, and tobacco, etc. The grinding and cutting occurs as a result of reciprocal two-way movement of the material to be ground across the surface of the sheet. This makes the grinder very efficient to use. It is also easy to carry. In a preferred form, the grinder is the size of a credit card, and can easily fit in a briefcase, business card holder or wallet. It can also be put in a book or notebook, and even in a pocket.

Figure 3:
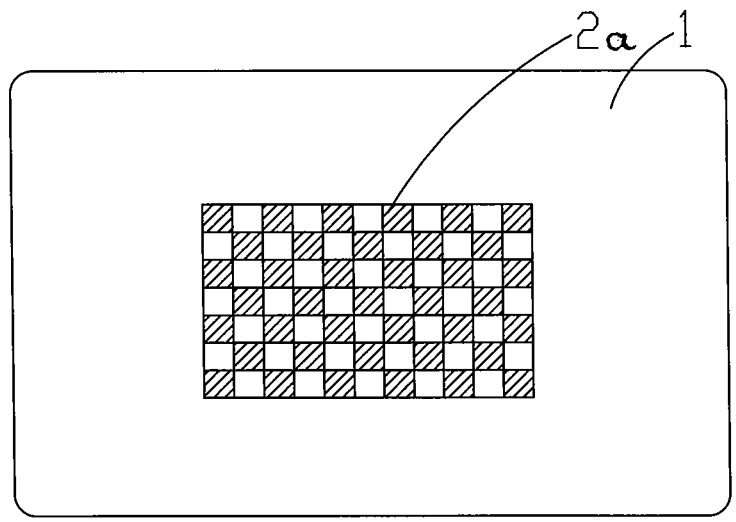
FIG. 3 is a plan view of another embodiment of the invention.

FIG. 3 shows an alternative embodiment of the grinder. The difference from the grinder shown in FIGS. 1 and 2 is that each of the grooves 2a has a square shape, and the grooves are neatly arranged into rows and columns of alternating grooves and square spaces forming a checkerboard pattern within the grinding space. In order to better illustrate the difference between the grooves and the adjacent surface of the sheet in the spaces between the grooves, the grooves have been illustrated with a hatching pattern in FIG. 3 (and in subsequent Figs.) to distinguish between the grooves and the adjacent spaces. Compared with the embodiment shown in FIGS. 1 and 2, the grinding resistance of the embodiment shown in FIG. 3 is less, which results in a smoother and more delicate grind.

Figure 4:
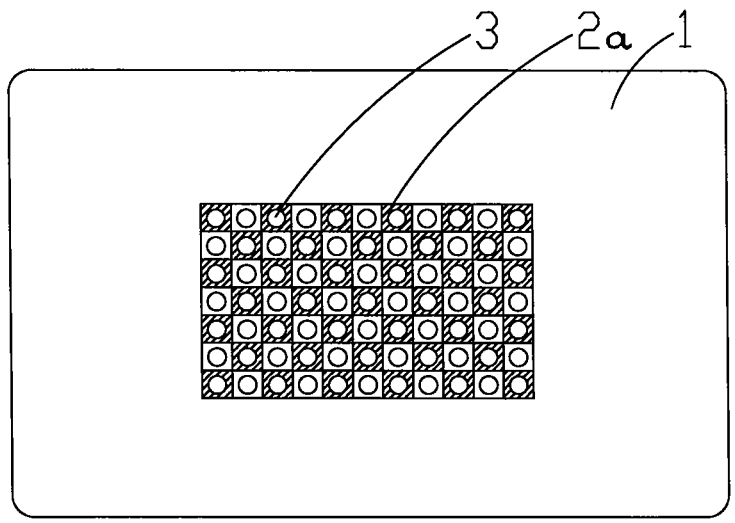
FIG. 4 is a plan view of yet another embodiment of the invention.

The alternative embodiment shown in FIG. 4 is similar to the embodiment shown in FIG. 3, except that there are through holes 3 provided in the grooves 2a and on the adjacent surface of the sheet 1 in the spaces between the grooves. The holes extend completely through the sheet. The holes perform an additional grinding and cutting function. They add new cutting edges to the grinder, making it even more efficient than the previous embodiment. The holes also have the added feature of eliminating waste bits from the grooves and the adjacent surfaces of the grinder, thereby preventing waste accumulation that could adversely affect the grinding.

Figure 5:
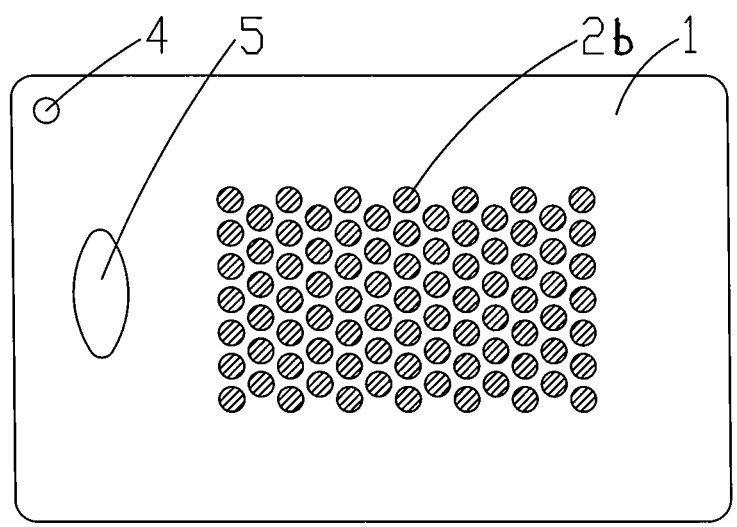
FIG. 5 is a plan view of still another embodiment of the invention.

In the alternative embodiment shown in FIG. 5, the difference is that the grooves 2b have a circular shape. There are spaces between the grooves, and these circular grooves form the grinding area.

In addition, in order to make the grinder more convenient, a hanging hole 4 is provided on the corner of the sheet 1. The hole can be used to hang the grinder on a keychain so that it can be carried around easily by the user. In addition, the grinder also has been provided with a bottle opener 5 in the form of a large oval opening near the edge of the sheet 1. The many possible functions of the bottle opener add convenience and versatility to the grinder.

Figure 6:
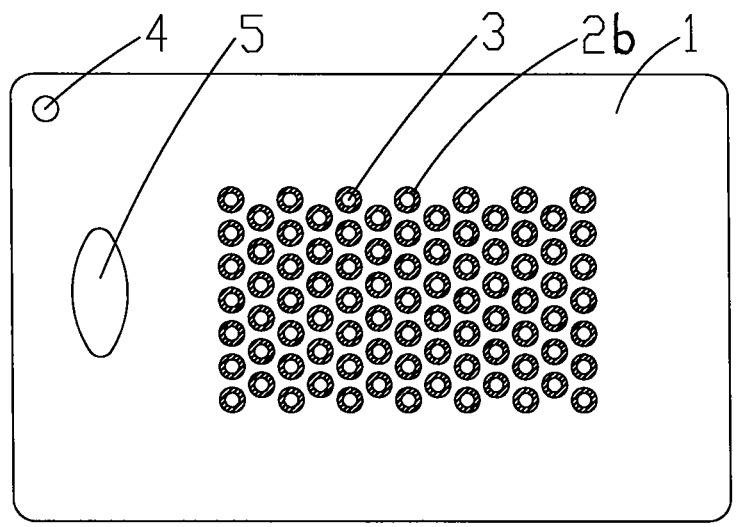
FIG. 6 is a plan view of another embodiment of the invention.

The alternative embodiment shown in FIG. 6, is similar to the grinder shown in FIG. 5, but with the addition of through holes 3 within the circular grooves 2b. The diameters of the holes 3 are preferably smaller than the diameters of the circular grooves, so that each hole is surrounded by an individual groove. The holes 3 have the same function as the holes in the embodiment of FIG. 4. However, in this particular embodiment, the holes are only formed in the grooves and are not distributed on the surfaces of the sheet.

The grooves can take on different shapes other than those shown in FIGS. 1-6, such as triangles, ovals, stars, polygons, and can also be hearts or even other irregular shapes, and combinations thereof. The size and shape of the grooves also can differ from groove to groove, and the grooves can be evenly or unevenly aligned.

Figure 7:
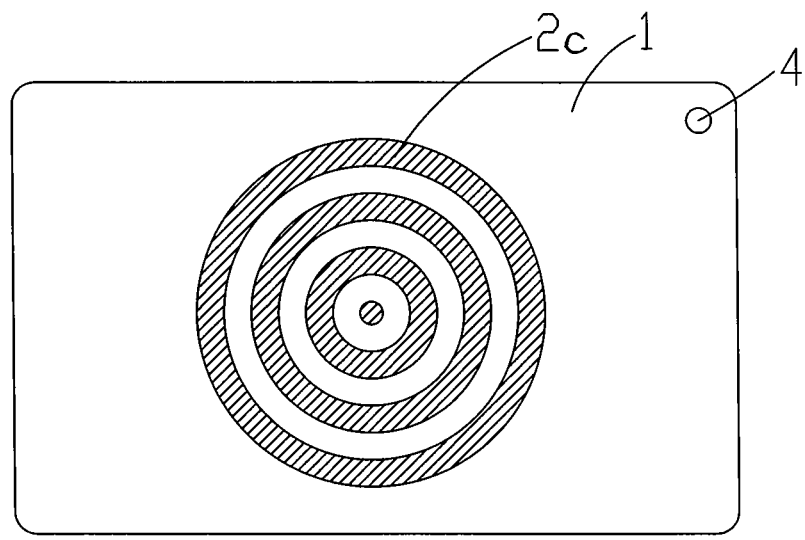
FIG. 7 is a plan view of yet another embodiment of the invention.

In the alternative embodiment shown in FIG. 7, the grooves 2c are formed as a series of concentric rings spaced apart at specific radial intervals. The sidewalls of the ring-like grooves 2c are not straight lines in the grinding area. Instead they form an arc, and this has the effect of pushing material being ground inward when grinding. This makes it much easier to crush and grind the material, and more efficient than if the sidewalls of the grooves were straight.

Figure 8:
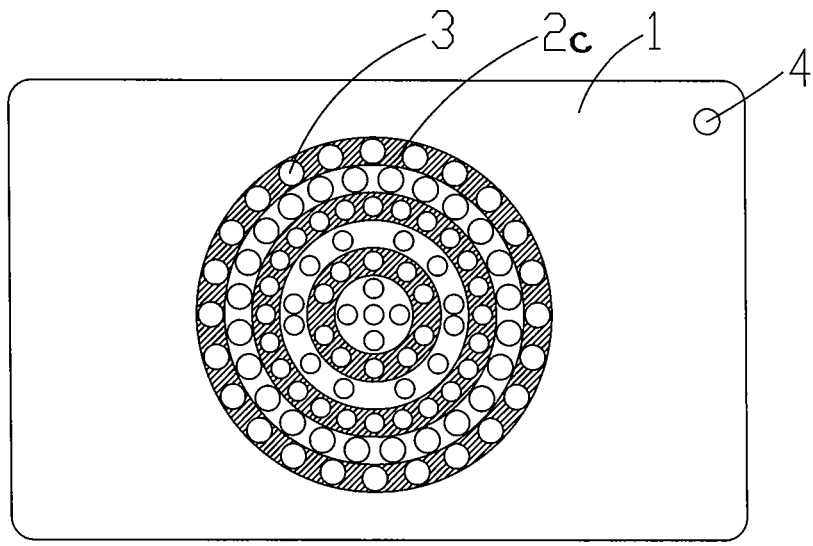
FIG. 8 is a plan view of still another embodiment of the invention.

FIG. 8 shows an alternative embodiment similar to FIG. 7, the difference being that there are through holes 3 distributed both in the grooves 2c and on the adjacent surfaces of the sheet 1. The holes 3 vary in size and spacing in different regions of the grinding area. Some regions have larger holes, while others have smaller holes. There are higher concentration of holes in some regions and lower concentration of holes in other regions. The holes 3 have the same function as the holes in the previous embodiments.

Figure 9:
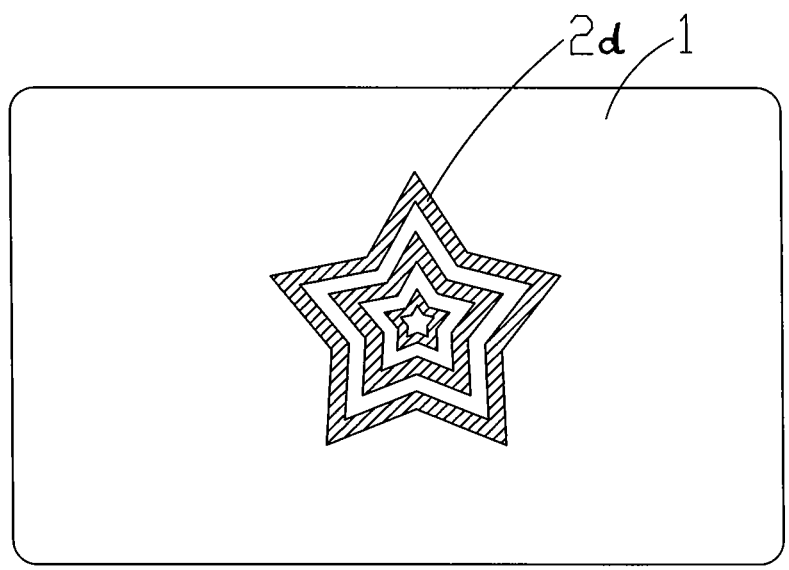
FIG. 9 is a plan view of another embodiment of the invention.

The embodiment shown in FIG. 9 is similar to the embodiment shown in FIG. 7, except that the grooves 2d form concentric star shaped patterns which are distributed at specific radial intervals.

Figure 10:
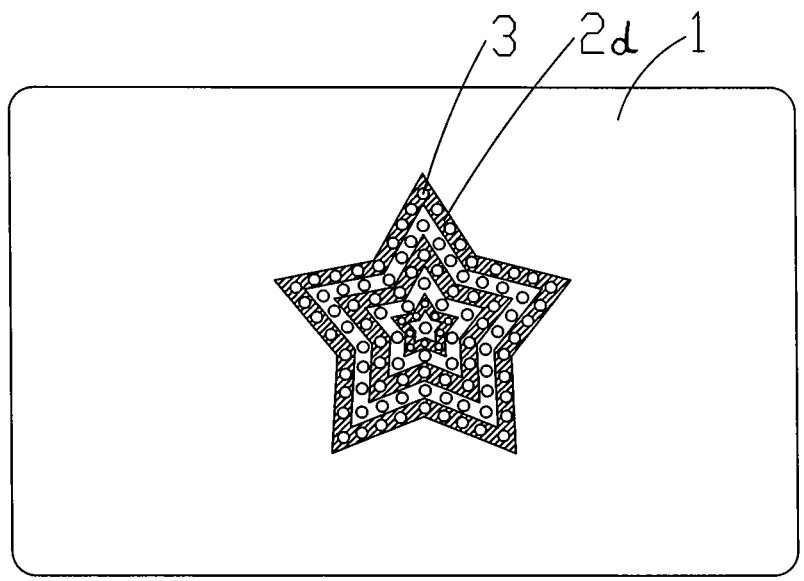
FIG. 10 is a plan view of still another embodiment of the invention.

The embodiment shown in FIG. 10 is similar to the embodiment shown in FIG. 9, but with through holes similar to the holes in FIG. 8. Like the embodiment shown in FIG. 8, the through holes 3 are again distributed both in the grooves 2d and on the adjacent surfaces of the sheet 1. And, similar to FIG. 8, the size and spacing of the holes 3 vary in different regions of the grinding area. The holes 3 have the same function as the holes in the previous embodiments.

In addition to stars, the grooved areas can take the shape of ovals, hearts, gems, and many other irregular shapes.

Figure 11:
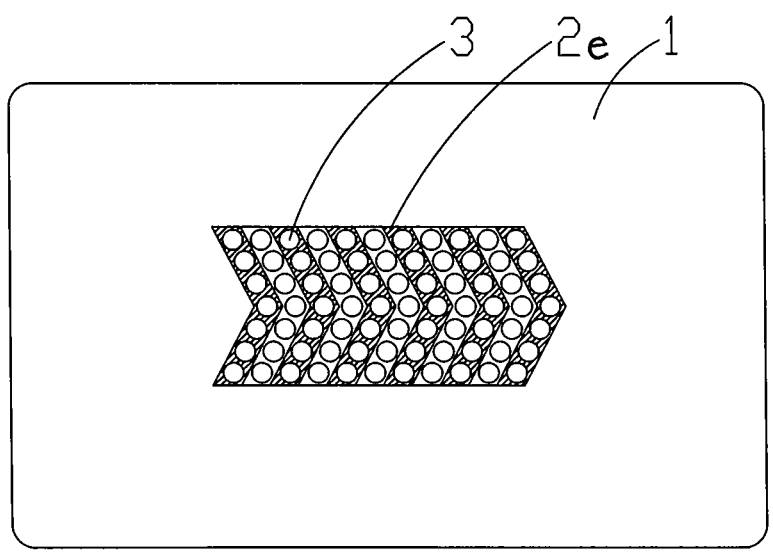
FIG. 11 is a plan view of yet another embodiment of the invention.

FIG. 11 shows an alternative embodiment in which the grooved areas 2e are V-shaped or arrowhead shaped and spaced apart at parallel intervals. Again, the grooved areas 2e and the sheet 1 form the grinding surface. Like the embodiment shown in FIG. 10 and previous embodiments, holes 3 are distributed both in the grooved areas and on the adjacent surfaces of sheet 1 in the spaces between the grooved areas. Like the previous embodiment of FIGS. 7 and 8, the angles between the sidewall segments which intersect to form the V-shape grooves also provides an inward pushing effect on the material being ground, resulting in easier crushing and grinding of the material.

Figure 12:
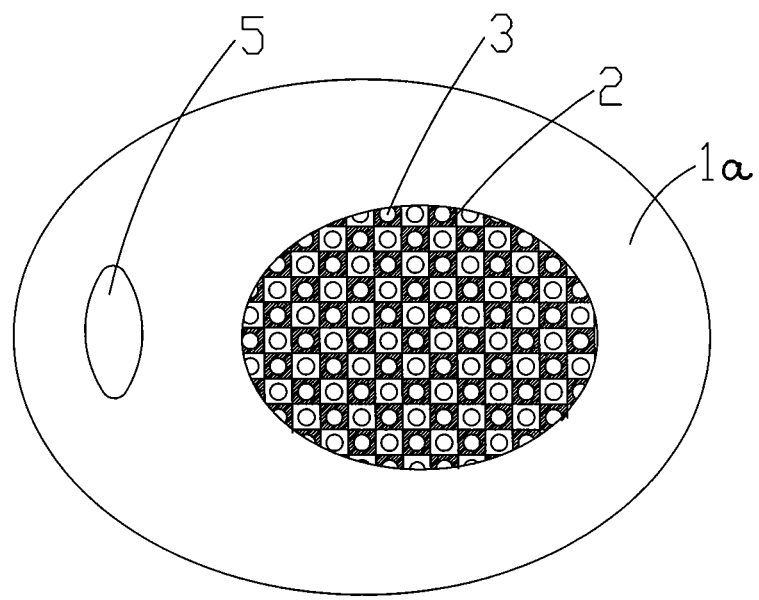
FIG. 12 is a plan view of another embodiment of the invention.

The embodiment shown in FIG. 12 is similar to the embodiment shown in FIG. 4, the difference being that both the shape of the sheet 1a and the shape of the grinding area is an oval. A bottle opener 5 also is provided. The bottle opener 5 also can be used as a hanging hole for the grinder, if desired.

Figure 13:
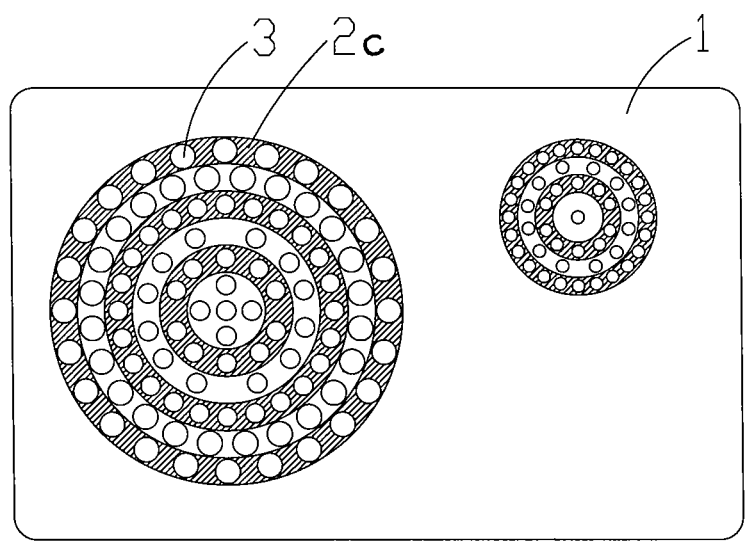
FIG. 13 is a plan view of yet another embodiment of the invention.

The embodiment shown in FIG. 13 has grinding areas similar to the ones shown in FIG. 8 except that there are two different grinding areas of two different sizes provided. These two grinding areas can be used for different functions. For example, one can be used as a rough grinding area while the other can be used as a fine grinding area. This provides different selections of grinding within the same sheet.

Figure 14:
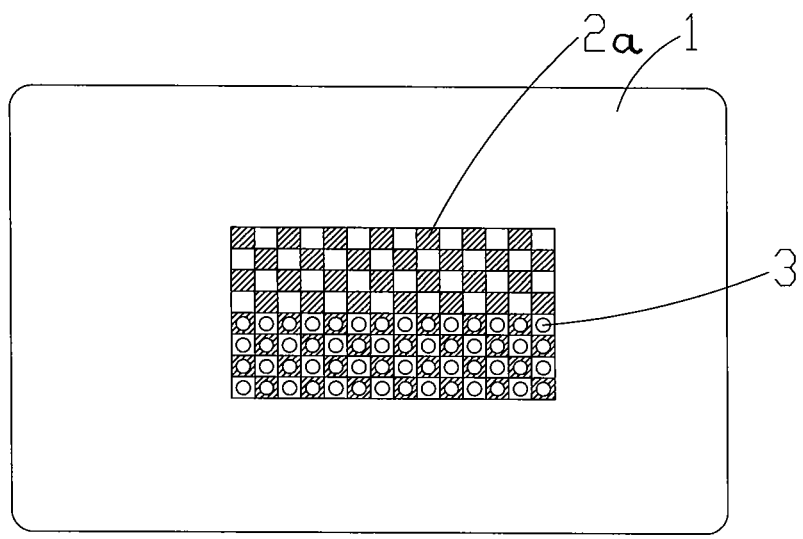
FIG. 14 is a plan view of still another embodiment of the invention

FIG. 14 shows an alternate way of providing two different grinding areas on the same sheet. While the embodiment shown in FIG. 13 had two spatially separated grinding areas on the same sheet, the embodiment shown in FIG. 14 uses two different but adjacent grinding patterns within the same grinding area. The grinding patterns are a combination of the patterns shown in FIG. 3 and FIG. 4. The pattern without the through holes serves as a normal grinding area, while the pattern with the through holes serves as a more highly-efficient grinding zone.

In all of the embodiments mentioned above, the notches or grooves are generally (but not necessarily) rectangular in cross-sectional shape with sidewalls that are preferably but not necessarily perpendicular to the flat surface of the sheet. The angle between the sidewall and the flat surface of the sheet can be either acute or obtuse. When the angle is acute, the grinding edge protrudes more. The cutting effect is enhanced, and the grinding effect is reduced. When the angle is obtuse, the cutting edge is more blunt. As a result, the grinding effect is enhanced, while the cutting effect is reduced.

In order to prevent the ground bits from adhering to the surface of the grinder and thereby reducing the effectiveness and service life of the grinder, and in order to make it easier to clean the grinder after each use, the grinder is preferably coated with a non-stick material on the surface of the sheet, such as Teflon, so that the grinder can be easily washed and quickly cleaned. A frosted or brushed finish also may be applied to the surface of the grinder, if desired In all of the foregoing embodiments, the sheet can be made out of plastic, metal, wood or glass, and combinations thereof. The thickness of the sheet is preferably between about 0.15 mm and 5 mm. When the grinder includes the bottle opener option, the sheet material normally needs to be a little thicker. The depth of the notches or grooves is preferably between 0.005-2 mm. A shallow depth notch or groove generally results in a grinder which can grind to a more fine texture. The size of the holes is preferably between about 0.5 mm and 15 mm, with 4 mm being typical.

In all of the foregoing embodiments, the shape of the sheet is preferably flat, but if desired, the sheet may also be bent or curved. When it is curved in a concave manner, the sheet can be placed on a surface and the ground bits can be allowed to fall under the sheet, which is useful when grinding large amount of materials, without the need to move the grinder.

In all of the foregoing embodiments, there are many ways of forming the notches or grooves. For example, the notches or grooves can be formed using a CNC machine, mold stamping, laser cutting, or water jetting to process the sheets. Another option is to use mask chemical corrosion which when processing, causes the bottom of the notches or grooves to be corroded and rough, which can enhance the grinding efficiency. The surface of the sheet itself also can be either smooth or rough, as desired. The holes can be formed by stamping or punching or by any other suitable means, and they can be formed in the sheet before or after the grooves have been formed.

It will be appreciated that each of the grinders described above may be used individually to grind a herb, or they may be used in pairs for a dual grinding action. When used in pairs, it is desirable that both grinders be identical and have the grinding area disposed along a longitudinal edge of the card with a series of horizontal grooves extending away from the edge. In use, the user holds one grinder in each hand, and with a back and forth motion, grinds herb placed between the two grinders. This dual grinding action is particularly useful for quickly grinding large amounts of herb without touching the herb with one's fingers The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

We claim:

1. A herb grinder comprising a sheet having a first surface, and a plurality of grooves in a pattern on the surface, forming a grinding area, the grooves having a square shape and being arranged in a checkerboard pattern of alternating grooves and square spaces within the grinding area, each groove having a flat bottom with a roughened surface, and a plurality of through holes distributed in the grooves and on the surface of the sheet in the spaces between the grooves.

2. The herb grinder of claim 1, wherein the angles between the sidewalls of the grooves and the surface of the sheet are acute or obtuse.

3. The herb grinder of claim 1, wherein the surface of the sheet is coated with a non-stick material.

4. The herb grinder of claim 1, wherein the sheet is made from a material selected from the group consisting of plastic, metal, wood, and glass.

5. The herb grinder of claim 1, wherein the grinder has multiple grinding areas.

6. The herb grinder of claim 1, wherein the sheet is flat or curved.

7. The herb grinder of claim 1, wherein the grinding area is free of cutting blades protecting above the surface of the sheet.

8. A herb grinder comprising a sheet having a first surface, and a plurality of grooves on the surface, forming a grinding area, the grooves having a circular shape and being arranged in a pattern of adjacent rows or columns within the grinding area, each groove having a flat bottom with a roughened surface, and a plurality of through holes distributed in the grooves.

9. The herb grinder of claim 8, wherein the angles between the sidewalls of the grooves and the surface of the sheet are acute or obtuse.

10. The herb grinder of claim 8, wherein the surface of the sheet is coated with a non-stick material.

11. The herb grinder of claim 8, wherein the sheet is made from a material selected from the group consisting of plastic, metal, wood, and glass.

12. The herb grinder of claim 8, wherein the grinder has multiple grinding areas.

13. The herb grinder of claim 8, wherein the sheet is flat or curved.

14. The herb grinder of claim 8, wherein the grinding area is free of cutting blades projecting above the surface of the sheet.

* * * * *